United States Patent
Amamoto

(10) Patent No.: US 12,377,740 B2
(45) Date of Patent: Aug. 5, 2025

(54) VEHICLE POWER SUPPLY DEVICE

(71) Applicant: TOYOTA JIDOSHA KABUSHIKI KAISHA, Toyota (JP)

(72) Inventor: Yuki Amamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 18/135,952

(22) Filed: Apr. 18, 2023

(65) Prior Publication Data
US 2023/0415590 A1 Dec. 28, 2023

(30) Foreign Application Priority Data
Jun. 28, 2022 (JP) ................................ 2022-103419

(51) Int. Cl.
| | |
|---|---|
| B60L 53/16 | (2019.01) |
| B60L 50/51 | (2019.01) |
| B60L 50/60 | (2019.01) |
| H01R 25/14 | (2006.01) |

(52) U.S. Cl.
CPC ............. *B60L 53/16* (2019.02); *B60L 50/51* (2019.02); *B60L 50/60* (2019.02); *H01R 25/14* (2013.01); *B60L 2210/12* (2013.01); *B60L 2210/14* (2013.01)

(58) Field of Classification Search
None
See application file for complete search history.

(56) References Cited

U.S. PATENT DOCUMENTS

| | | | |
|---|---|---|---|
| 2018/0269445 A1* | 9/2018 | Chen | .................. H01M 10/482 |
| 2019/0131609 A1 | 5/2019 | Fukushima et al. | |
| 2020/0161795 A1 | 5/2020 | Aoki | |
| 2021/0101498 A1* | 4/2021 | Sugimoto | ............... B60L 53/11 |
| 2021/0265706 A1 | 8/2021 | Yamada | |

FOREIGN PATENT DOCUMENTS

| | | | | |
|---|---|---|---|---|
| EP | 3605658 A1 * | 2/2020 | ............. | G06F 30/23 |
| JP | 2017-33694 A | 2/2017 | | |
| JP | 2020-087580 A | 6/2020 | | |
| JP | 2020-114156 A | 7/2020 | | |
| WO | 2017/175622 A1 | 10/2017 | | |
| WO | 2020/095585 A1 | 5/2020 | | |

* cited by examiner

*Primary Examiner* — Justin S Lee
(74) *Attorney, Agent, or Firm* — Sughrue Mion, PLLC

(57) ABSTRACT

A vehicle power supply device includes: equipment disposed on an electrical path leading to a DC inlet of an electrified vehicle; and a DC connector disposed on the electrical path. The DC connector includes a first connector attached to a housing of the equipment. The first connector includes a terminal disposed inside the housing and a bus bar fastening portion provided at a tip of the terminal. The equipment includes a bus bar disposed inside the housing and including one end connected to a component of the equipment. The bus bar includes a connector fastening portion fastened to the bus bar fastening portion via a fastener, and a metal Z-shaped spring that expands and contracts in a direction parallel to a stretching direction of the bus bar at the end on the other end side.

14 Claims, 3 Drawing Sheets

VEHICLE POWER SUPPLY DEVICE

CROSS-REFERENCE TO RELATED APPLICATION

This application claims priority to Japanese Patent Application No. 2022-103419 filed on Jun. 28, 2022, incorporated herein by reference in its entirety.

BACKGROUND

1. Technical Field

The present disclosure relates to a vehicle power supply device in which a direct current (DC) connector is used for connection between equipment.

2. Description of Related Art

Japanese Unexamined Patent Application Publication No. 2020-087580 (JP 2020-087580 A) discloses a connector used for electrical connection in an electrified vehicle such as a battery electric vehicle.

SUMMARY

When the system voltage of the electrified vehicle is raised to 800 V or the like, it is required to increase the body size of the DC connector such as thickening the electric wire to withstand heat rise. One connector of the DC connector (first connector) is attached to the housing of the equipment included in the vehicle power supply device, and there is a limit in the interior space of the housing.

Regarding the connection between the first connector and the bus bar in the housing, in order to absorb the positional deviation between the first connector and the bus bar, a method of using a braided wire as an electric wire of the first connector that is connected to the interior is considered. However, when the braided wire is used, the size of the first connector increases, so it may be difficult to establish a structure for absorbing the positional deviation in a limited space in the housing.

The present disclosure has been made in view of the above problems, and an object thereof is to provide a vehicle power supply device that can realize the absorption of positional deviation between the DC connector and the bus bar in the housing of the equipment while suppressing increase in size of the DC connector.

A vehicle power supply device according to the present disclosure includes equipment and a DC connector. The equipment is disposed on an electrical path leading to a DC inlet of an electrified vehicle. The DC connector is disposed on the electrical path. The DC connector includes a first connector attached to a housing of the equipment, and a second connector assembled to the first connector. The first connector includes a terminal disposed inside the housing and a bus bar fastening portion provided at a tip of the terminal. The equipment includes a bus bar disposed inside the housing and including one end connected to a component of the equipment. The bus bar includes a connector fastening portion fastened to the bus bar fastening portion via a fastener, and a metal Z-shaped spring that is interposed between the other end of the bus bar and the connector fastening portion or interposed partway through the bus bar at an end of the bus bar on the other end side, and that expands and contracts in a direction parallel to a stretching direction of the bus bar at the end on the other end side.

The equipment may be a battery pack that supplies electric power to a driving motor of the electrified vehicle.

The equipment may be a step-up and step-down converter disposed on the electrical path between the DC inlet and a battery pack that supplies electric power to a driving motor of the electrified vehicle.

With the vehicle power supply device according to the present disclosure, by utilizing the Z-shaped spring disposed as described above, compared to an example in which a braided wire is used to absorb the positional deviation between the DC connector (first connector) and the bus bar, absorption of the positional deviation can be realized while suppressing an increase in the size of the DC connector.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle power supply device according to an embodiment of the present disclosure will be described below with reference to the accompanying drawings. Elements common to each figure are given the same reference signs, and overlapping descriptions are omitted or simplified.

1. Configuration of Vehicle Power Supply Device

Figure 1:
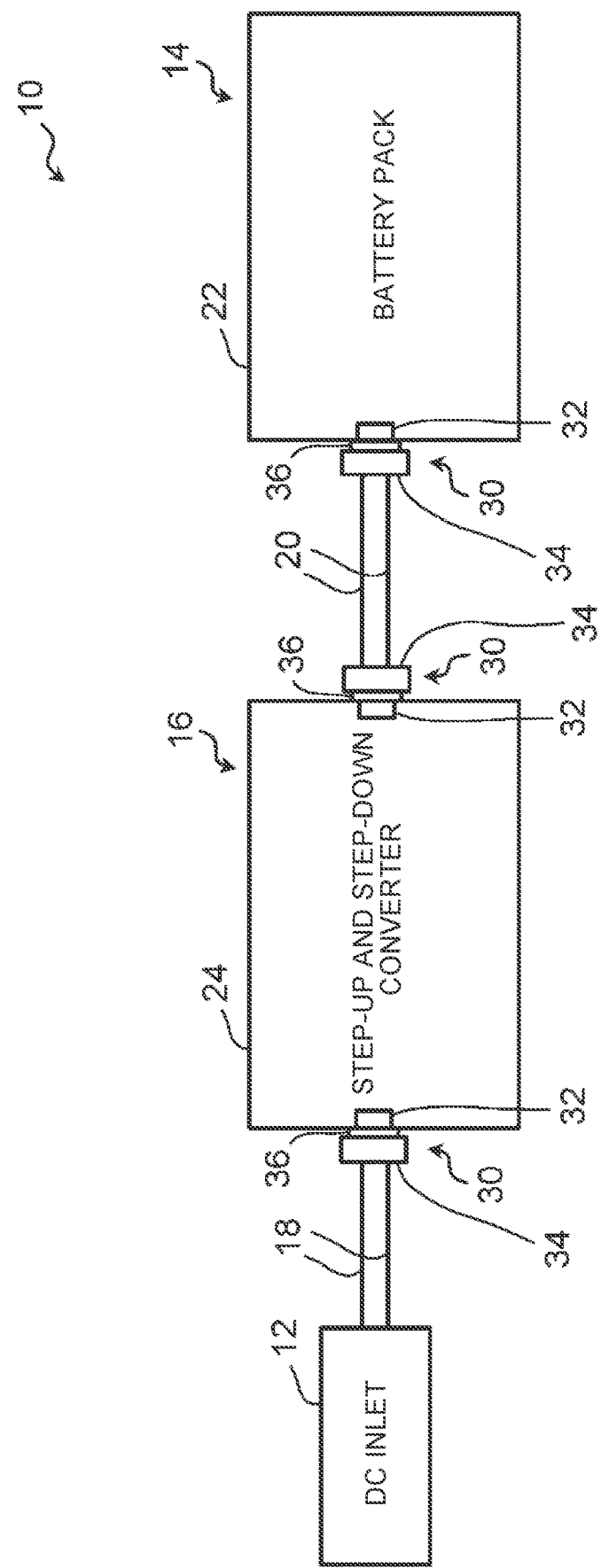
FIG. 1 is a diagram schematically showing an example of a configuration of a vehicle power supply device according to an embodiment.

FIG. 1 is a diagram schematically showing an example of a configuration of a vehicle power supply device 10 according to an embodiment. The vehicle power supply device 10 is installed in an electrified vehicle such as a battery electric vehicle (BEV) and a plug-in hybrid electric vehicle (PHEV).

The vehicle power supply device 10 includes a direct current (DC) inlet 12, a battery pack 14, and a step-up and step-down converter 16. Each of the battery pack 14 and the step-up and step-down converter 16 corresponds to an example of "equipment" disposed on an electrical path leading to the DC inlet 12. Specifically, the DC inlet 12 and the step-up and step-down converter 16 are connected via a pair of positive and negative power lines 18. The step-up and step-down converter 16 and the battery pack 14 are connected via a pair of positive and negative power lines 20.

The vehicle power supply device 10 can receive power supply from an external DC power supply via the DC inlet 12. The voltage applied to the vehicle power supply device 10 from the external DC power supply is a high voltage such as 800 V.

The battery pack 14 includes a housing 22. The housing 22 accommodates, for example, battery peripheral components (e.g., relays and fuses) connected to a battery stack together with the battery stack.

The step-up and step-down converter (step-up and step-down DC/DC converter) 16 includes a housing 24. The housing 24 accommodates, for example, a step-up and step-down circuit, a high voltage cutoff circuit, and a DC relay. The step-up and step-down converter 16 (step-up and step-down circuit) is configured to have a step-down function to drop the voltage (e.g., 800 V) supplied from the DC inlet 12 to the battery pack 14 to a predetermined voltage (e.g., 400 V). Further, the step-up and step-down converter 16 is configured to have a step-up function of increasing the voltage (e.g., 400 V) supplied from the battery pack 14 to a predetermined voltage (e.g., 800 V). The high voltage stepped up by the step-up and step-down converter 16 is supplied to an inverter (not shown) for driving a driving motor (not shown) of the electrified vehicle, for example.

The vehicle power supply device 10 includes a DC connector 30 disposed on an electrical path leading to the DC inlet 12. Specifically, as shown in FIG. 1, the connection between the DC inlet 12 and the step-up and step-down converter 16 using the power lines 18 is performed via the DC connector 30. The DC connector 30 is similarly used for connecting the step-up and step-down converter 16 and one end of each of the power lines 20. Further, the DC connector 30 is similarly used for connecting the other end of each of the power lines 20 and the battery pack 14. Each DC connector 30 is composed of a first connector 32 and a second connector 34 assembled to the first connector 32. A reference sign 36 in FIG. 1 denotes a fitting portion where the connectors 32 and 34 are fitted together. The first connector 32 is one of a male connector and a female connector, and the second 5 connector 34 is the other of the male connector and the female connector.

Figure 2:
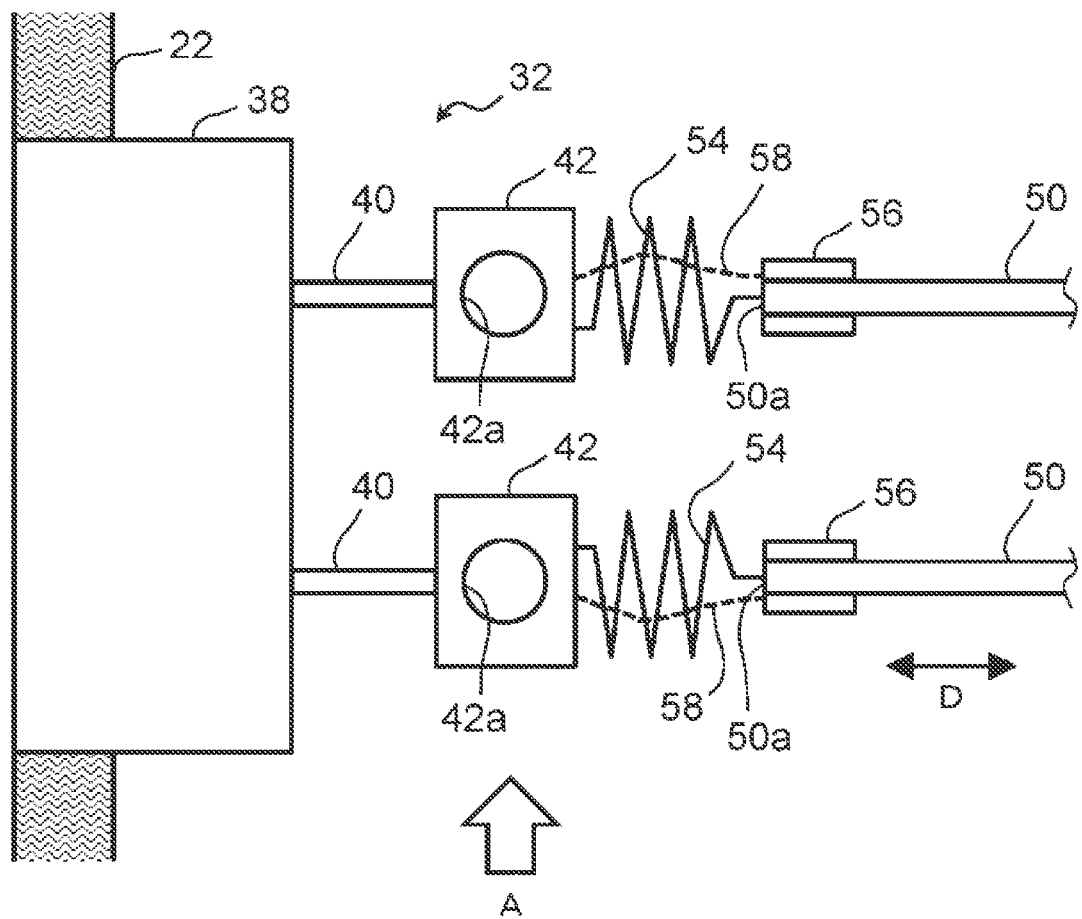
FIG. 2 is a diagram schematically showing a structure around a first connector shown in FIG. 1.
Figure 3:
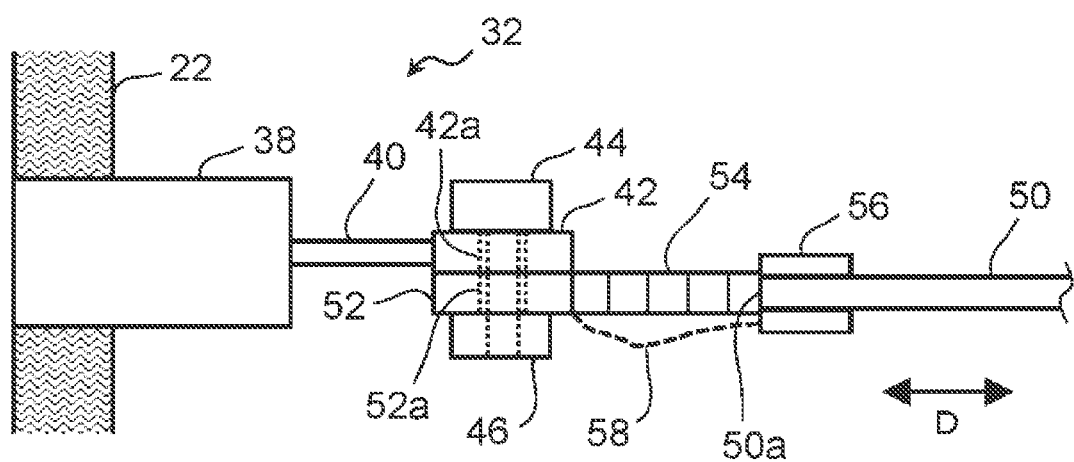
FIG. 3 is a diagram schematically showing the structure around the first connector as viewed from the direction of the arrow A in FIG. 2.

FIG. 2 is a diagram schematically showing a structure around the first connector 32 shown in FIG. 1. FIG. 3 is a diagram schematically showing the structure around the first connector 32 as viewed from the direction of the arrow A in FIG. 2.

Although FIGS. 2 and 3 illustrate the structure around the first connector 32 10 attached to the housing 22 of the battery pack 14, the same applies to the structure around the first connectors 32 attached to the housing 24 of the step-up and step-down converter 16. In FIGS. 2 and 3, illustration of the second connector 34 and the fitting portion 36 is omitted.

The first connector 32 includes a resin housing 38, a pair of positive and negative terminals 40, and a pair of bus bar fastening portions 42. Each terminal 40 is a metal 15 terminal and is attached to the housing 38. Each terminal 40 is disposed inside the housing 22 of the battery pack 14. The bus bar fastening portion 42 is fixed to the tip of each terminal 40 (the end opposite to the housing 38). Each bus bar fastening portion 42 is made of metal and has a fastening hole 42a for a bolt 44 (see FIG. 3). Note that the bus bar fastening portion 42 may be formed integrally with the terminal 40.

The battery pack 14 includes a pair of positive and negative bus bars 50 disposed inside the housing 22. FIGS. 2 and 3 show the end of the bus bar 50 on the first connector 32 side. Each bus bar 50 is made of metal and has one end (not shown) connected to a component (e.g., a relay) of the battery pack 14. Note that in the example of the first connector 32 attached to the housing 24 of the step-up and step-down converter 16, the bus bar corresponding to the first connector 32 has one end connected to a component of the step-up and step-down converter 16.

Each bus bar 50 includes a connector fastening portion 52 (see FIG. 3) and a metal Z-shaped spring 54. Each connector fastening portion 52 is made of metal and has a fastening hole 52a for the bolt 44. Each connector fastening portion 52 is fastened to the bus bar fastening portion 42 via the bolt 44 and a nut 46, which are examples of fasteners, while overlapping the bus bar fastening portion 42. Note that the nut 46 may be fixed to the connector fastening portion 52 in advance, or, unlike the example shown in FIG. 3, the nut 46 may be fixed to the bus bar fastening portion 42 in advance.

The Z-shaped spring 54 is interposed between the other end 50a of the bus bar 50 and the connector fastening portion 52. The Z-shaped spring 54 is provided so as to expand and contract in a direction parallel to the extending direction D of the bus bar 50 at the end on the other end 50a side. The Z-shaped spring 54 is formed by bending a plate-shaped member, for example.

More specifically, for example, one end of the Z-shaped spring 54 is fixed to a metal nut 56 by a method such as welding. The nut 56 is fixed to the other end 50a of the bus bar 50 by a method such as screwing. The other end of the Z-shaped spring 54 is fixed to the connector fastening portion 52 by a method such as welding. Also, the bus bar and the connector fastening portion 52 are connected by an electric wire 58 via the nut 56.

2. Effect

The internal spaces of the housings (e.g., housings 22 and 24) of the equipment of the vehicle power supply device 10 such as the battery pack 14 and the step-up and step-down converter 16 described above are limited. More specifically, since various components of the equipment are disposed in the housing, the bus bar connected to the first connector is disposed utilizing the limited space in the housing while avoiding each component.

In order to absorb positional deviation (misalignment) between the terminal of the first connector 32 and the bus bar 50 disposed in the environment as described above, the vehicle power supply device 10 according to the present embodiment has the Z-shaped spring 54 interposed between the other end 50a of the bus bar 50 and the connector fastening portion 52. The Z-shaped spring 54 can be mounted in a small space. By providing the Z-shaped spring 54 disposed as described above, the expansion and contraction of the Z-shaped spring 54 can be utilized to absorb the positional deviation in a small space. Therefore, compared to an example in which a braided wire is used to absorb the positional deviation, it is possible to absorb the positional deviation while suppressing an increase in the size of the first connector 32 (DC connector 30).

3. Other Disposing Example of Z-Shaped Spring

Figure 4:
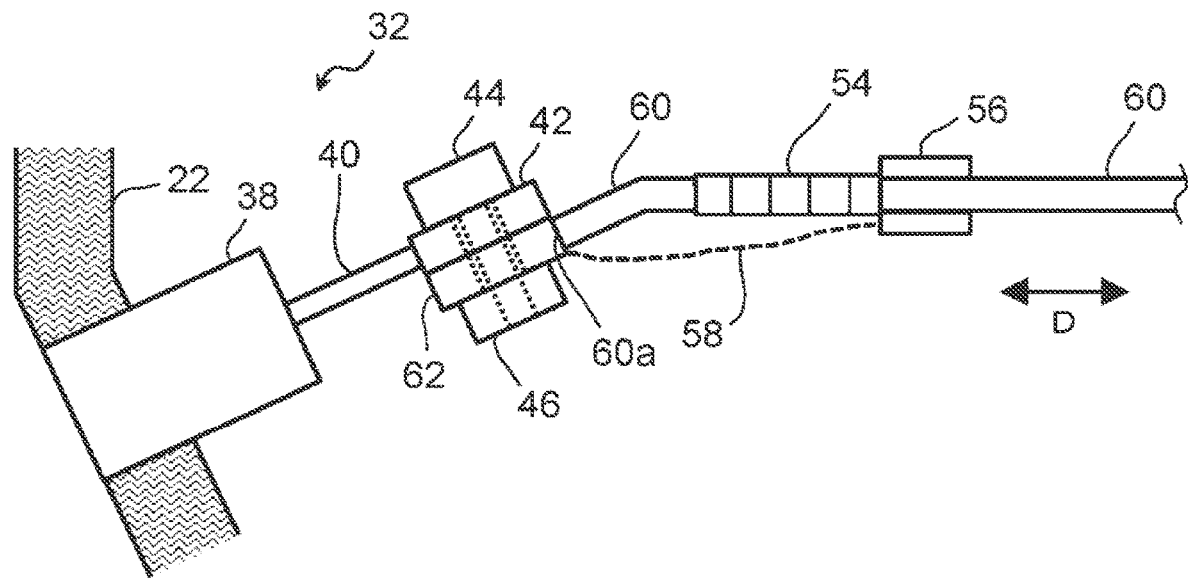
FIG. 4 is a diagram illustrating another disposing example of a Z-shaped spring according to the embodiment.
Figure 5:
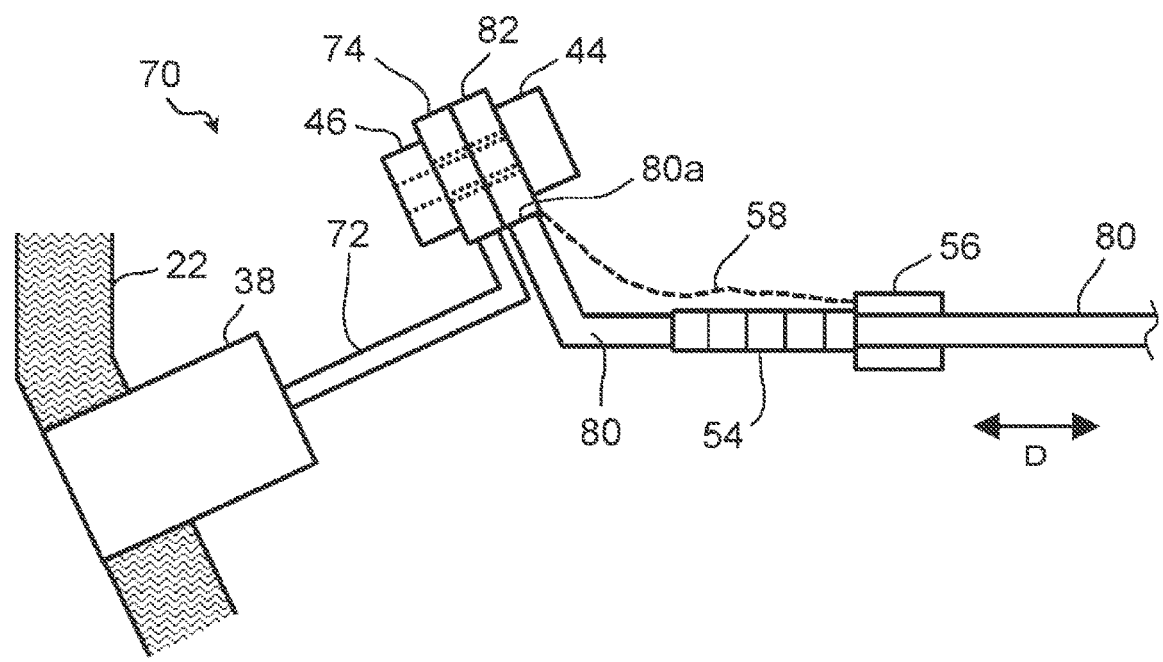
FIG. 5 is a diagram illustrating still another disposing example of the Z-shaped spring according to the embodiment.

FIG. 4 is a diagram illustrating another disposing example of the Z-shaped spring 54 according to the embodiment. FIG. 4 and FIG. 5 described later are diagrams showing the structure around the first connector viewed from the same direction as FIG. 3.

In the example shown in FIG. 4, each of the pair of positive and negative bus bars 60 disposed inside the housing 22 includes a connector fastening portion 62 and the Z-shaped spring 54. The connector fastening portion 62 is fixed to the other end 60a of the bus bar 60 (the tip of the end of the bus bar 60 on the first connector 32 side shown in FIG. 4). The connector fastening portion 62 may be formed integrally with the bus bar 60. In this example, the Z-shaped spring 54 is provided so as to expand and contract in a direction parallel to the extending direction D of the bus bar 60 at the end on the other end 60a side.

The structure shown in FIG. 4 also makes it possible to absorb the positional deviation between the first connector 32 and the bus bar 60 in a small space by utilizing the expansion and contraction of the Z-shaped spring 54. Therefore, compared to an example in which a braided wire is used to absorb the positional deviation, it is possible to absorb the positional deviation while suppressing an increase in the size of the first connector 32 (DC connector).

FIG. 5 is a diagram illustrating still another disposing example of the Z-shaped spring 54 according to the embodiment. In the example shown in FIG. 5, a first connector 70 of the DC connector includes the housing 38 made of resin, a pair of positive and negative terminals 72, and a pair of bus bar fastening portions 74. The terminals 72 are bent on the way from the housing 38 to the bus bar fastening portions 74.

Each of the pair of positive and negative bus bars 80 disposed inside the housing 22 includes a connector fastening portion 82 and the Z-shaped spring 54. The connector fastening portion 82 is fixed to the other end 80a of the bus bar 80 (the tip of the end of the bus bar 80 on the first connector 70 side shown in FIG. 5). The connector fastening portion 82 may be formed integrally with the other end 80a. Also in this example, similarly to the example shown in FIG. 4, the Z-shaped spring 54 is provided so as to expand and contract in a direction parallel to the extending direction D of the bus bar 80 at the end on the other end 80a side. Such a structure also has the same effect as the example shown in FIG. 4.

4. Other Example of Equipment

In the embodiment described above, the battery pack 14 and the step-up and step-down converter 16 are exemplified as "equipment disposed on an electrical path leading to the DC inlet of the electrified vehicle." However, the "equipment" may include, for example, an electric supply unit (ESU) (not shown) connected to the battery pack 14 via a pair of positive and negative power lines. The ESU is a unit that integrates alternating current (AC) charging, power conversion, and power distribution functions. The "DC connector" according to the present disclosure may be disposed, for example, on an electrical path positioned between the ESU and the battery pack 14 in a vehicle power supply device including such an ESU.

What is claimed is:

1. A vehicle power supply device comprising:
 equipment disposed on an electrical path leading to a DC inlet of an electrified vehicle; and
 a DC connector disposed on the electrical path, wherein:
 the DC connector includes
  a first connector attached to a housing of the equipment, and
  a second connector assembled to the first connector;
 the first connector includes a terminal disposed inside the housing and a bus bar fastening portion provided at a tip of the terminal;
 the equipment includes
  a bus bar disposed inside the housing and including one end connected to a component of the equipment, and
  a first nut fixed to the bus bar;
 the bus bar includes
  a connector fastening portion fastened to the bus bar fastening portion via a fastener, and
  a metal Z-shaped spring that is interposed between the other end of the bus bar and the connector fastening portion or interposed partway through the bus bar at an end of the bus bar on the other end side, that expands and contracts in a direction parallel to a stretching direction of the bus bar at the end on the other end side, and that is fixed to the first nut; and
 the equipment includes an electric wire that connects the connector fastening portion and the first nut.

2. The vehicle power supply device according to claim 1, wherein the equipment is a battery pack that supplies electric power to a driving motor of the electrified vehicle.

3. The vehicle power supply device according to claim 1, wherein the equipment is a step-up and step-down converter disposed on the electrical path between the DC inlet and a battery pack that supplies electric power to a driving motor of the electrified vehicle.

4. A vehicle power supply device comprising:
 equipment disposed on an electrical path leading to a DC inlet of an electrified vehicle; and
 a DC connector disposed on the electrical path; and
 a fastener,
 wherein:
 the DC connector includes
  a first connector attached to a housing of the equipment, and
  a second connector assembled to the first connector;
 the first connector includes a terminal disposed inside the housing and a bus bar fastening portion provided at a tip of the terminal;
 the equipment includes
  a bus bar disposed inside the housing and including (i) a first end connected to a component of the equipment and (ii) a second end, and
  a first nut fixed to the second end of the bus bar;
 the bus bar includes
  a connector fastening portion fastened to the bus bar fastening portion via the fastener, and
  a metal Z-shaped spring that is interposed between the second end of the bus bar and the connector fastening portion and is fixed to the first nut; and
 the equipment includes an electric wire that connects the connector fastening portion and the first nut.

5. The vehicle power supply device according to claim 1, wherein the bus bar is bent between the connector fastening portion and the first nut.

6. The vehicle power supply device according to claim 1, wherein the terminal of the first connector is bent.

7. The vehicle power supply device according to claim 5, wherein the terminal of the first connector is bent.

8. The vehicle power supply device according to claim 1, wherein the fastener includes a bolt and a second nut.

9. The vehicle power supply device according to claim 4, wherein the equipment is a battery pack that supplies electric power to a driving motor of the electrified vehicle.

10. The vehicle power supply device according to claim 4, wherein the equipment is a step-up and step-down converter disposed on the electrical path between the DC inlet and a battery pack that supplies electric power to a driving motor of the electrified vehicle.

11. The vehicle power supply device according to claim 4, wherein the bus bar is bent between the connector fastening portion and the first nut.

12. The vehicle power supply device according to claim 4, wherein the terminal of the first connector is bent.

13. The vehicle power supply device according to claim 11, wherein the terminal of the first connector is bent.

14. The vehicle power supply device according to claim 4, wherein the fastener includes a bolt and a second nut.

* * * * *